United States Patent Office 3,445,574
Patented May 20, 1969

3,445,574
COMPOSITIONS AND METHOD FOR ARRESTING SPASMS WITH THE DIETHYLAMINOETHYL ESTER OF BETA-(1-NAPHTHYL)-BETA'-TETRA-HYDROFURYLISOBUTYRIC ACID
Etienne Szarvasi, Lyon, and Liliane Neuvy, Paris, France, assignors to Lipha, Lyonnaise Industrielle Pharmaceutique, a corporation of France
No Drawing. Continuation-in-part of application Ser. No. 308,662, Sept. 13, 1963. This application Mar. 23, 1966, Ser. No. 536,612
Claims priority, application France, Sept. 20, 1962, 83,555
Int. Cl. A61k 25/00, 27/00
U.S. Cl. 424—285      8 Claims

ABSTRACT OF THE DISCLOSURE

The present disclosure relates to the arresting of spasms of the circulatory system in humans by the use of compositions containing the diethylaminoethyl ester of beta-(1-naphthyl)-beta'-tetrahydrofurylisobutyric acid.

---

This application is a continuation-in-part of application Ser. No. 308,662, filed Sept. 13, 1963, now abandoned.

The present invention relates to a method of stopping the spasms of invalids and to a composition including a new derivative of a disubstituted aliphatic acid.

Certain alpha-substituted carboxylic acids represented by the general formula:

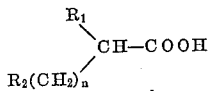

in which:

$n$ is an odd number at most equal to 3;
$R_1$ is a member of the group comprising the 1-naphthyl and 1-naphthylmethyl radicals;
$R_2$ is a member of the group comprising the furyl, tetrahydrofuryl and, when $n$ denotes the number 1 and $R_1$ the 1-naphthyl radical, vinyl and 1-propenyl radicals, are already known.

The present invention relates to compositions containing the diethylaminoethyl ester of beta-(1-naphthyl)-beta'-tetrahydrofurylisobutyric acid, and their use for arresting spasms of the circulatory systems.

The new compound is prepared from beta-(1-naphthyl)-beta'-tetrahydrofurylisobutyric acid. This acid is obtained by saponifying ethyl alpha-(1-naphthylmethyl)-alpha-tetrahydrofurfurylmalonate by an alkali in the presence of benzyl alcohol.

The diethylaminoethyl ester of beta-(1-naphthyl)-beta'-tetrahydrofurylisobutyric acid can be prepared by azeotropic esterification, for example in xylene, of beta-(1-naphthyl)-beta'-tetrahydrofurylisobutyric acid by means of diethylaminoethanol.

Beta-(1-naphthyl)-beta'-tetrahydrofurylisobutyrate of N-diethylaminoethyl may also be prepared by the action of beta-chloroethyl-N-diethylamine on beta-(1-naphthyl)-beta'-tetrahydrofurylisobutyric acid. In this case, a higher yield is obtained.

The diethylaminoethyl ester of beta-(1-naphthyl)-beta'-tetrahydrofurylisobutyric acid possesses very exceptional anti-spasmodic properties. Thus, in the Magnus test on the isolated intestine of the rabbit it exhibits an activity from 30 to 40 times higher than that of papaverine, with the appreciable atropine component, see Arch. Anat. Physiol. Lpz. 1904, 102–123.

There are hereinafter described as non-limiting examples methods of preparation and physical properties of the afove-mentioned compound.

Example 1

N-diethylaminoethyl beta-(1-naphthyl)-beta'-tetrahydrofurylisobutyrate

Empirical formula $C_{24}H_{33}NO_3$
Molecular weight M=383.5
Developed formula

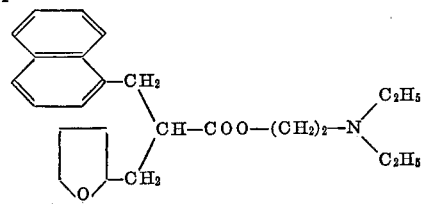

In an apparatus provided with a Dean and Stark device, 38 g. (0.133 mol.) of beta-(1-naphthyl)-beta'-tetrahydrofurylisobutyric acid solution in 450 cc. of anhydrous xylene, 18 g. (0.133 mol.) of diethylaminoethanol and 0.5 g. of toluene-para-sulphonic acid are heated under reflux for 7 hours. After the usual treatment, the distillation yields 19.5 g. of viscous yellow liquid passing over under 2 millibars at 210–213° C. Yield 38% (theoretical quantity 51 g.).

After redistillation, there is obtained an analytically pure product possessing the following constants:

Density $d_4^{31}=1.0465$
Refractive index $n_D^{29}=1.5515$

*Gravimetric analysis.*—Calculated: C, 75.18%; H, 8.67%; N, 3.65%. Found: C, 75.31%; H, 8.38%; N, 3.62%.

Example 2

These are heated under reflux for 8½ hours 30 g. (0.106 mol.) of beta-(1-naphthyl)-beta'-tetrahydrofurylisobutyric acid in 230 cc. of isopropanol with 14 g. (0.103 mol.) of beta-chloroethyl-N-diethylamine. After evaporation of the isopropanol in vacuo, the syrupy residue is treated with a solution of $K_2CO_3$. The product is extracted with ether and, after drying over $Na_2SO_4$, distillation of the extract yields 28.5 g. of a very viscous yellow liquid having a boiling point $BP_{0.95-1.09\,millibar}=198-202°$ C. The yield is 70.5% (theoretical quantity=40.5 g.).

It has been found that the diethylaminoethyl of beta-(1-naphthyl)-beta'-tetrahydrofurylisobutyric acid in a sterile solution may be injectably administered to invalids in dosage unit form of about 20 to about 200 mg. and acts to prevent and especially acts to arrest spasms of the circulatory systems; spasms which usually accompany an arteriopathic condition.

The following results of actual clinical tests demonstrate the effectiveness of diethylaminoethyl-beta-(1-naphthyl)-beta'-tetrahydrofurylisobutyrate, called L.S. 84, when applied to humans. This compound is liposoluble. Ampules were prepared containing 65 mg. of the product dissolved in 1 ml. of neutralized olive oil. The product was administered by deep intramuscular injections at the rate of one ampule per day and when the local condition improved, the dosage was administered every second day or every third day.

Example 3

Mr. F. was 60 years old with an arteriopathic condition of right leg, diabetes, and gangrene of one toe.

Treatment.—20 intramuscular injections of the L.S. 84 ampules described above were administered one every day followed by 5 injections at the rate of one every third day.

Result.—Complete healing of ulceration by scale formation.

Example 4

Mr. B. was 61 years old with a prolonged and multiple arteriopathic condition, diabetes, pains of decubitus, intermittent limping, range of walking limited to 50 meters. The decubitus pains were felt in the lower extremities while lying down with loss of sleep as the result of such pains. During the day the patient experienced strong pains which caused him to limp when walking.

Treatment.—10 intramuscular injections of the L.S. 84 ampules were administered one per day.

Result.—Decubitus pains disappeared and the patient's walking range was extended to more than 500 meters.

Example 5

Mr. R. was 73 years old with coronary arteropathia and impairment of the lower right extremity. He experienced intense decubitus pains requiring him to get out of bed several times every night.

Treatment.—15 intramuscular injections were administered one each day followed by 10 injections at the rate of one every second day.

Result.—The patient has no further decubitus pains and has entirely regained his sleep.

Example 6

Mr. W. was 69 years old with an arteriopathic condition of both lower extremities. Amputation at the left side. Recent obliteration on the right side. Intermittent limping. Cold feet. Necrosis on the right toe. The patient had been previously treated without effect by administration of Hydrosarpan. Hydrosarpan is a major vasolidator recognized as a remedy in the Renaud sickness, in the treatment of arteries and coronarities, as well as in the treatment of hypertension. Hydrosarpan is a drug distributed in France by the Servier Laboratories and contains an alkaloid of Rauwolfia serpentia, called Raubasine, as the active ingredient in 1 mg. pills.

Treatment.—20 intramuscular injections of 84 ampules were administered one each day.

Result.—After several months of recess the patient has almost complete cessation of decubitus pains; intermittent limping improved; very marked warming of the right foot and total healing of foot ulceration in 30 days.

Example 7

Mr. L. was 62 years old with arteritis of upper right extremity with subsequent acute occlusion; hand pale—tingling; pulse impalpable.

Treatment.—One intramuscular injection into the deltoid muscle every day for 5 days.

Result.—Tingling was disappeared, warming of the extremity; pulse returned.

Example 8

Mrs. P. was 60 years old with diabetes, intermittent limping at 100 meters; nocturnal decubitus pains; amputation of the right toe; lowered temperature of the leg.

Treatment.—12 intramuscular injections of L.S. 84 ampules one each day.

Result.—Night pains ceased; strong warming up of the extremity; normalizing of the skin color.

Example 9

Mr. F. was 65 years old with arteriopathy of lower left extremity, with intermittent limping, pains in the left leg, decubitus pains, trophic troubles (limited in surface are but deep penetrating necrosis).

Treatment.—17 intramuscular injections of L.S. 84 ampulses, one every day, followed by 8 intramuscular injections, one every second day.

Result.—Almost complete disappearance of decubitus pains; patient no longer requires sleeping pills; range of walking greatly increased (1 km.); marked warming up of the left foot. One month later there was a healing of 50% of the ulceration surface.

Thus, it was found that diethylaminoethyl beta-(1-naphthyl)-beta'-tetrahydrofurylisobutyrate was very efficient in the treatment of clinical symptoms of arteriopathic conditions of extremities. The deep intramuscular injections were well tolerated.

The spasmodic activity was studied on an isolated intestine and spasms produced by means of barium chloride were used to determine the papaverinic activity of the product. The papaverinic coefficient indicates the smallest dose of the product in relation to the smallest dose of papaverine capable of arresting or intensifying movements induced in an isolated duodenum of a rat or the intestine of a guinea pig.

The atrophinic activity coefficient was measured in the same way with the spasms being produced by acetylcholine.

N - diethylaminoethyl - beta - (1 - naphthyl) - beta'-tetrahydrofurylisobutyrate acts in such tests in a remarkable way showing papaverinic activity of 3000 to 4000, while the activity of papaverine is, under the same condition 100; the product also has atrophinic activity.

The lethal dosage of the product is 50 for mice, administered intravenously, 30 mg./kg. The toxicity is much lower when the product is injected intramuscularly.

This product is very efficient in the treatment of clinical symptoms of arteriopathic conditions of extremities, ulcerations of lower extremities, heaviness in legs, intermittent limping, nocturnal acroparesthesia, postphlebitic syndromes, trophic troubles (ulcerations, scabs, pregangrene conditions), skin grafts; with daily doses of 20–200 mg. administered parenterally.

What is claimed is:

1. A antispasmodic and vasodilatatory composition for preventing and stopping the spasms of humans comprising as active ingredient in effective dose, per dosage unit, of diethylaminoethyl beta-(1-naphthyl)-beta'-tetrahydrofurylisobutyrate of the formula

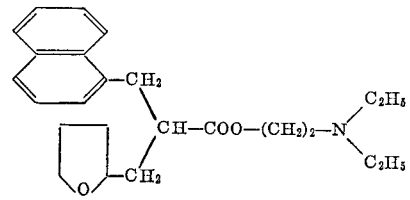

and a carries therefor.

2. A composition in accordance with claim 1 wherein the active ingredient is in a sterile solution.

3. A composition in accordance with claim 1 wherein about 20 to about 200 mg. of the active ingredient per dosage unit is in a sterile oily solution.

4. The method of preventing and stopping the spasms of humans which comprises the administration to said humans of an effective dose, per dosage unit, of diethylaminoethyl beta - (1-naphthyl) - beta'-tetrahydrofurylisobutyrate of the formula:

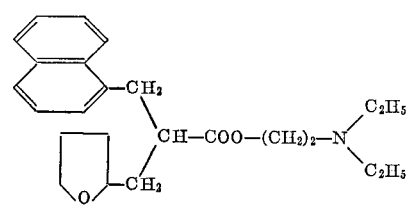

5. The method of claim 4 wherein the material is administered parenterally.

6. The method of claim 5 wherein the material is administered in a sterile solution.

7. The method of claim 4 wherein the dosage unit is about 20 to about 200 mg. of the active ingredient.

8. The method of claim 7 wherein the active ingredient is in a sterile oily solution.

References Cited

UNITED STATES PATENTS 3,257,420 6/1966 Szarvasi et al.

FOREIGN PATENTS 1,289,597 9/1962 France.

ALBERT T. MEYERS, *Primary Examiner.*

S. J. FRIEDMAN, *Assistant Examiner.*